(12) United States Patent
Bannon

(10) Patent No.: US 10,081,440 B2
(45) Date of Patent: Sep. 25, 2018

(54) RAM AIR TURBINE RELEASE MECHANISM WITH STROKE AMPLIFICATION

(71) Applicant: Hamilton Sundstrand Corporation, Charlotte, NC (US)

(72) Inventor: David G. Bannon, Rockford, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 392 days.

(21) Appl. No.: 15/054,810

(22) Filed: Feb. 26, 2016

(65) Prior Publication Data

US 2017/0247117 A1 Aug. 31, 2017

(51) Int. Cl.
*B64D 41/00* (2006.01)
*F03D 9/00* (2016.01)
*F03D 9/25* (2016.01)
*B64D 27/26* (2006.01)

(52) U.S. Cl.
CPC ........... *B64D 41/007* (2013.01); *B64D 27/26* (2013.01); *F03D 9/002* (2013.01); *F03D 9/25* (2016.05)

(58) Field of Classification Search
None
See application file for complete search history.

(56) References Cited

U.S. PATENT DOCUMENTS

| 6,142,443 A * | 11/2000 | Potschin | F02M 47/027 123/472 |
| 7,185,828 B2 | 3/2007 | Igashira et al. | |
| 8,640,563 B2 * | 2/2014 | Lang | B64D 41/007 74/89.37 |

FOREIGN PATENT DOCUMENTS

| WO | 9954626 A1 | 10/1990 |
| WO | 2015078254 A1 | 6/2015 |

\* cited by examiner

*Primary Examiner* — Justin Seabe
*Assistant Examiner* — Juan G Flores
(74) *Attorney, Agent, or Firm* — Cantor Colburn LLP

(57) ABSTRACT

A ram air turbine actuator release device to release a ram air turbine actuator includes a lock bolt releasably engaged to the ram air turbine actuator, a toggle including a toggle roller to engage the lock bolt, and a toggle pivot to couple the toggle to the ram air turbine actuator, a toggle actuator, including an actuation source, and a stroke amplifier, including a piston coupled to the actuation source, a first hydraulic chamber having a first diameter in fluid communication with the piston, a second hydraulic chamber having a second diameter in fluid communication with the first hydraulic chamber, and a plunger in fluid communication with the second chamber, wherein a diameter ratio between the first hydraulic chamber and the second hydraulic chamber amplifies a displacement of the actuation source to displace the plunger to rotate the toggle to disengage the toggle roller from the lock bolt.

14 Claims, 4 Drawing Sheets

RAM AIR TURBINE RELEASE MECHANISM WITH STROKE AMPLIFICATION

BACKGROUND

The subject matter disclosed herein relates to release mechanisms, and more particularly, to release mechanisms for ram air turbines.

Ram Air Turbines (RATs) are utilized on numerous aircraft to provide hydraulic and electrical power in emergency situations. The RAT is stowed in the aircraft structure and deployed into the air stream by a deployment actuator. A release mechanism is utilized to release the deployment actuator as required. Often, the release mechanism may add additional weight to an aircraft and require adjustment to provide sufficient displacement and force for reliable operation.

BRIEF SUMMARY

According to an embodiment, a ram air turbine actuator release device to release a ram air turbine actuator includes a lock bolt releasably engaged to the ram air turbine actuator, a toggle including a toggle roller to engage the lock bolt, and a toggle pivot to couple the toggle to the ram air turbine actuator, a toggle actuator, including an actuation source, and a stroke amplifier, including a piston coupled to the actuation source, a first hydraulic chamber having a first diameter in fluid communication with the piston, a second hydraulic chamber having a second diameter in fluid communication with the first hydraulic chamber, and a plunger in fluid communication with the second chamber, wherein a diameter ratio between the first hydraulic chamber and the second hydraulic chamber amplifies a displacement of the actuation source to displace the plunger to rotate the toggle to disengage the toggle roller from the lock bolt.

According to an embodiment, a ram air turbine system includes a ram air turbine, a deployment actuator to deploy the ram air turbine, and a ram air turbine actuator release device to release the deployment actuator, the ram air turbine actuator release device including a lock bolt releasably engaged to the deployment actuator, a toggle including a toggle roller to engage the lock bolt, and a toggle pivot to couple the toggle to the deployment actuator, a toggle actuator, including an actuation source, and a stroke amplifier, including a piston coupled to the actuation source, a first hydraulic chamber having a first diameter in fluid communication with the piston, a second hydraulic chamber having a second diameter in fluid communication with the first hydraulic chamber, and a plunger in fluid communication with the second chamber, wherein a diameter ratio between the first hydraulic chamber and the second hydraulic chamber amplifies a displacement of the actuation source to displace the plunger to rotate the toggle to disengage the toggle roller from the lock bolt.

Technical function of the embodiments described above includes a stroke amplifier, including a piston coupled to the actuation source, a first hydraulic chamber having a first diameter in fluid communication with the piston, a second hydraulic chamber having a second diameter in fluid communication with the first hydraulic chamber, and a plunger in fluid communication with the second chamber, wherein a diameter ratio between the first hydraulic chamber and the second hydraulic chamber amplifies a displacement of the actuation source to displace the plunger to rotate the toggle to disengage the toggle roller from the lock bolt.

Other aspects, features, and techniques of the embodiments will become more apparent from the following description taken in conjunction with the drawings.

BRIEF DESCRIPTION OF THE DRAWINGS

The subject matter is particularly pointed out and distinctly claimed in the claims at the conclusion of the specification. The foregoing and other features, and advantages of the embodiments are apparent from the following detailed description taken in conjunction with the accompanying drawings in which like elements are numbered alike in the FIGURES:

DETAILED DESCRIPTION

Figure 1:
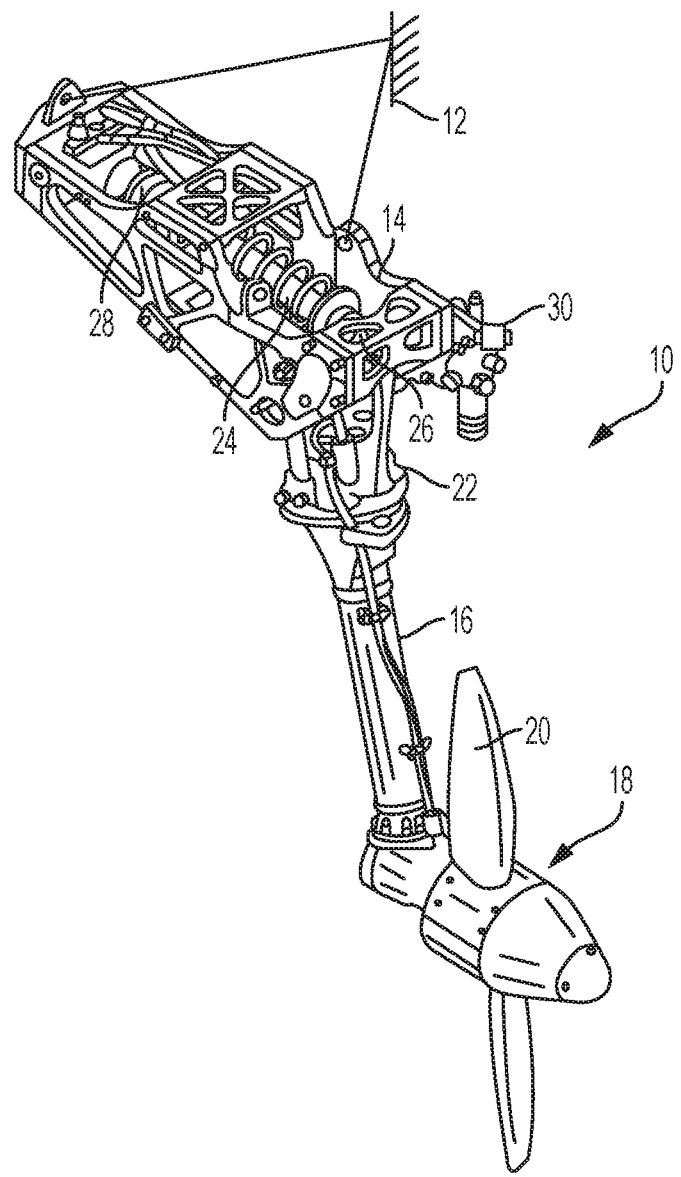
FIG. 1 is an isometric view of one embodiment of a ram air turbine.

Referring to the drawings, FIG. 1 shows a ram air turbine (RAT) system 10. In the illustrated embodiment, the RAT system 10 includes a housing 14, a strut 16, a turbine 18 and a deployment actuator 24. In the illustrated embodiment, the turbine 18 can be deployed into the airstream to generate electricity or pressurize hydraulic fluid for use within the aircraft during emergency events.

In the illustrated embodiment, the RAT system 10 is secured to an aircraft structure 12 by the housing 14. The housing 14 pivotally supports a strut 16 having a turbine 18 at one end. The turbine 18 includes blades 20, which impart rotational drive to at least one of a generator 22 and/or a hydraulic pump 30.

In the illustrated embodiment, the deployment actuator 24 is secured to the strut 16 at a first end 26 and to the housing 14 at a second end 28. In the illustrated embodiment, the deployment actuator 24 is stowed in a compressed position to allow the deployment actuator 24 to release the strut 16 and the turbine 18 when the deployment actuator 24 is released. In FIG. 1 the actuator 24 is illustrated in its deployed position.

Figure 2:
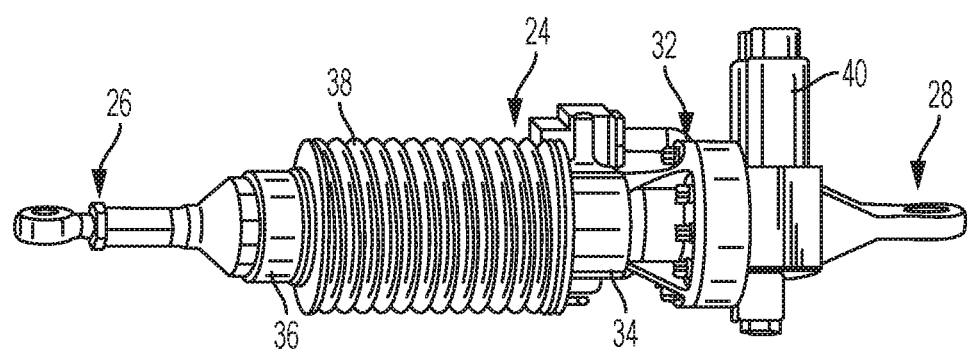
FIG. 2 is an isometric view of one embodiment of a deployment actuator for use with the ram air turbine of FIG. 1.
Figure 3:
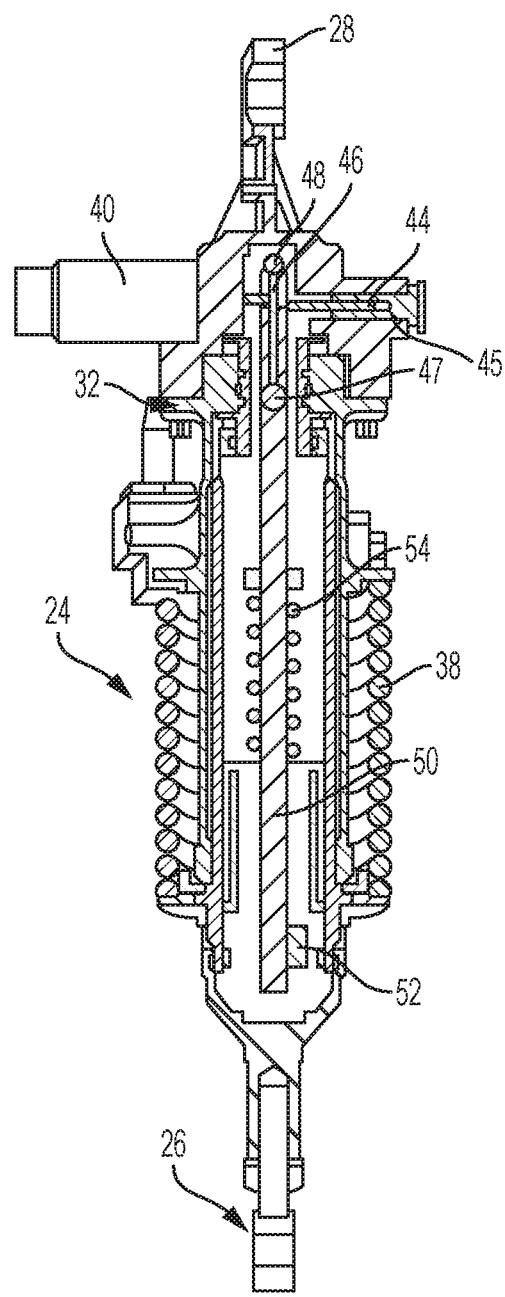
FIG. 3 is a cross sectional view of the deployment actuator of FIGS. 2.

Referring to FIGS. 2 and 3, the deployment actuator 24 is shown. In the illustrated embodiment, the deployment actuator 24 has a first end 26, a second end 28, a housing 32, a first cylinder 34, a second cylinder 36, a deployment spring 38 and a release mechanism 40. In the illustrated embodiment, the first cylinder 34 and the second cylinder 36 are telescopically arranged relative to each other.

In the illustrated embodiment, the deployment spring 38 is arranged between the first cylinder 34 and the second cylinder 36. In FIG. 2, the deployment spring 38 is shown in a compressed state with the actuator 24 in its retracted position. Advantageously, the energy required to deploy the turbine 18 is stored in the deployment spring 38 when the actuator 24 is in the retracted position.

In the illustrated embodiment, the release mechanism 40 is mounted near the second end 28 of the actuator 24. In the illustrated embodiment, the release mechanism 40 can be actuated to initiate the deployment sequence within e deployment actuator 24 and release the deployment spring 38.

Referring to FIG. 3 a simplified cross sectional view of the deployment actuator 24 is shown. In the illustrated embodiment, the deployment actuator 24 further includes a toggle 46, a reset plunger 44, and a lockbolt 50.

In the illustrated embodiment, the lockbolt 50 is shown in a simplified manner. In the illustrated embodiment, the lockbolt 50 within the deployment actuator 24 can actuate or otherwise manipulate the actuator locking mechanism 52. In the illustrated embodiment, the lockbolt 50 is biased in an upward position by the lockbolt spring 54 acting upon a shoulder or collar on the lockbolt 50.

In the illustrated embodiment, the actuator locking mechanism 52 is a pawl or ratchet mechanism that selectively keeps the deployment spring 38 compressed. In certain embodiments, the actuator locking mechanism 52 is any suitable mechanism to keep the deployment spring 38 compressed. In the illustrated embodiment, the actuator locking mechanism 52 can be disengaged by the upward movement of the lockbolt 50. After the actuator locking mechanism 52 is disengaged, the actuator locking mechanism 52 can release the deployment spring 38 to allow the deployment actuator 24 to deploy the turbine 18.

In the illustrated embodiment, the toggle 46 can prevent the upward movement of the lockbolt 50 until deployment is required. In the illustrated embodiment, the toggle 46 includes a toggle pivot 47 and a toggle roller 48. In the illustrated embodiment, the toggle 46 is a rigid bar that is fixed to the second end 28 via a toggle pivot 47. The toggle 46 can rotate about the toggle pivot 47. In the illustrated embodiment, the toggle roller 48 is disposed on the opposite end of the toggle 46 and follows the upper profile of the lockbolt 50. In a retracted position, the toggle roller 48 follows a flat surface of the lockbolt 50. In this position the toggle 46 reacts against the upward force of the lockbolt spring 54 to retain the lockbolt 50 in a retracted position.

In the illustrated embodiment, the plunger 42 can displace the toggle 46 in order to deploy the deployment actuator 24. In certain embodiments, the plunger 42 can displace the toggle 46 approximately $1/8^{th}$ of an inch to release the lockbolt 50. Further, in certain embodiments, the plunger 42 can apply a constant force to the toggle 46 to overcome the force of the lockbolt spring 54. In the illustrated embodiment, the plunger 42 is translated by the release mechanism 40. Advantageously, the release mechanism 40 can provide sufficient displacement and force for reliable operation of the lockbolt 50 without requiring additional adjustments such as shimming.

During operation, the plunger 42 pushes the toggle 46 to cause the toggle roller 48 to roll along the top of the lockbolt 50. As the toggle roller 46 rolls along the top of the lockbolt 50, the toggle 46 may require a constant force to overcome the bias force provided by the lockbolt spring 54. In the illustrated embodiment, as the toggle roller 48 reaches the rounded corner of the lockbolt 50, the toggle 46 no longer has to overcome the bias force of the lockbolt spring 54 to rotate about the toggle pivot 47. In the illustrated embodiment, the lockbolt 50 is free to move axially after the toggle 46 is pushed beyond the lockbolt 50. After the lockbolt 50 is disengaged by the toggle 46, the lockbolt 50 may be urged upward by the lockbolt spring 54. The lockbolt 50 can then release the actuator locking mechanism 52 as described.

After the deployment actuator 24 has been released, the deployment actuator 24 can be retracted to prepare the deployment actuator 24 for another use. As the deployment actuator 24 is retracted, the deployment spring 38 can be compressed to re-energize the deployment actuator 24. In the illustrated embodiment, the lockbolt 50 can be moved downward to recompress the lockbolt spring 54. As the lockbolt spring 54 is compressed and the lockbolt 50 is moved downward, the reset plunger 44 can urge the toggle 46 back to an engaged position. The reset plunger spring 45 can push the reset plunger 44 to place the toggle 46 on the top portion of the lockbolt 50.

Figure 4:
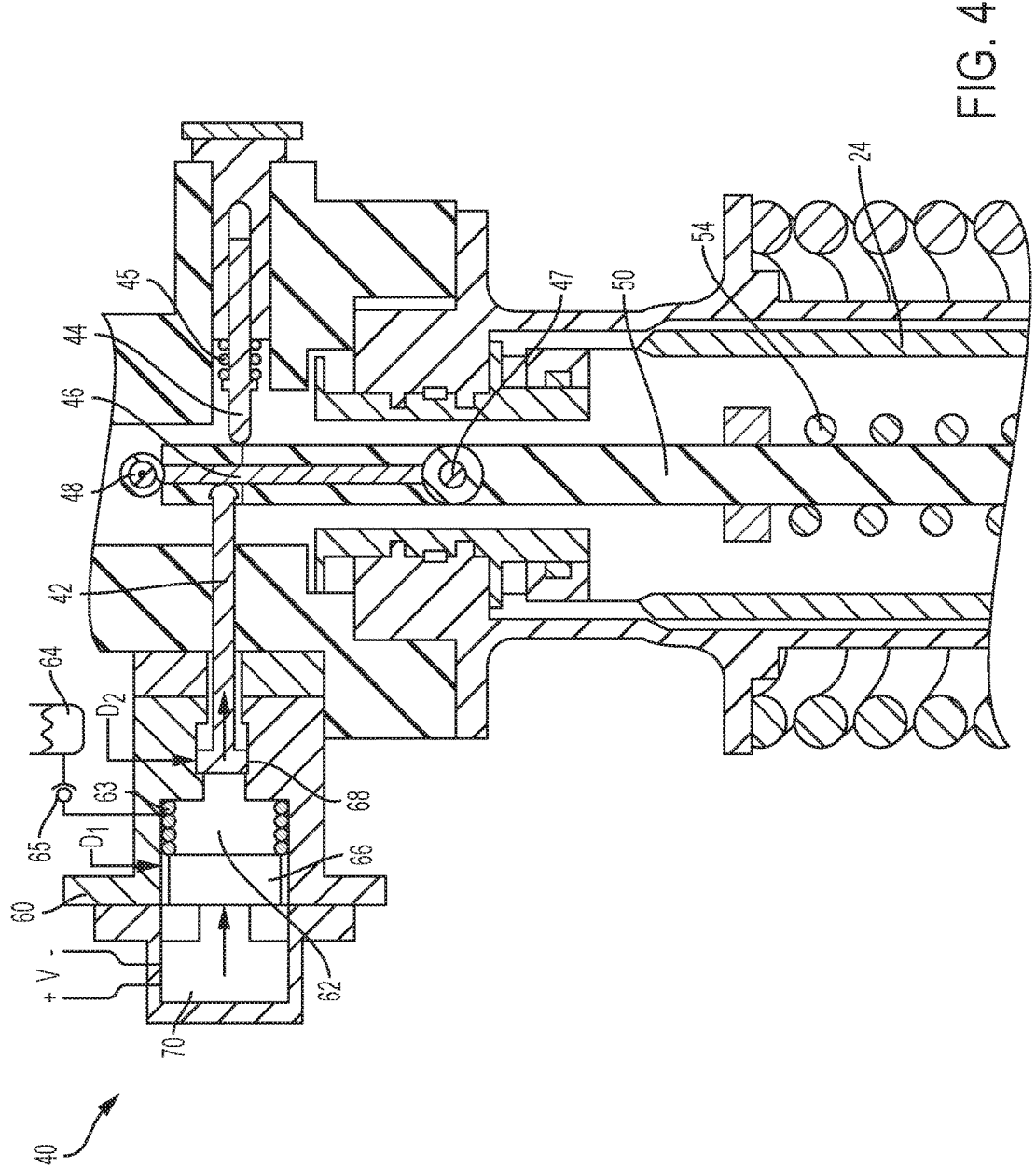
FIG. 4 is a schematic view of one embodiment of a release mechanism for use with the deployment actuator of FIG. 2.

Referring to FIG. 4, the actuator release mechanism 40 is shown in greater detail. In the illustrated embodiment, the actuator release mechanism 40 includes a stroke amplifier 60 and an actuation source 70. In the illustrated embodiment, the actuation source 70 can displace the plunger 42 via the stroke amplifier 60.

The actuation source 70 can be any suitable actuation source. In other embodiments, the actuation source 70 can be any actuator that may provide a high force and low displacement actuation. In the illustrated embodiment, the actuation source 70 is a piezoelectric actuator. Advantageously, piezoelectric actuators can provide high force when a voltage is applied, while providing reliable operation in high vibration and other harsh environments. In certain applications, the actuation source 70 may not provide sufficient displacement to disengage the toggle 46 from the lockbolt 50. In the illustrated embodiment, the actuation source 70 can be used with a stroke amplifier 60 to provide a greater displacement when using a high force, low displacement actuation source 70.

In the illustrated embodiment, the stroke amplifier 60 can amplify the displacement of the actuation source 70 to provide a desired displacement suitable to displace the plunger 42 to trip the toggle 46. In the illustrated embodiment, the stroke amplifier 60 includes a first chamber 62, a piston 66, and a second chamber 68.

In the illustrated embodiment, the actuation source 70 is coupled to the piston 66. During operation, as the actuation source 70 is energized, the displacement of the actuation source 70 can displace the piston 66. Accordingly, the piston 66 can displace hydraulic fluid within the first chamber 62. In the illustrated embodiment, the first chamber 62 has a first diameter. As the piston 66 is displaced, hydraulic fluid is displaced to increase force within the second chamber 68. In the illustrated embodiment, the second chamber 68 has a second diameter. In the illustrated embodiment, the plunger 42 can receive force and displacement from the second chamber 68.

In the illustrated embodiment, the second chamber 68 has a smaller second diameter than the first diameter of the first chamber 62. Therefore, the ratio between the diameter of the second chamber 68 and the diameter of the first chamber 62 creates a mechanical advantage that allows the plunger in communication with the second chamber 68 to be displaced further than the displacement of the piston 66. Accordingly, the plunger 42 is displaced further than the displacement caused by the actuation source 70. In certain embodiments, the ratio between the first diameter of the first chamber 62 and the second diameter of the second chamber 68 can be adjusted to provide the desired displacement amplification to the plunger 42.

In the illustrated embodiment, the return spring 63 disposed within the first chamber 62 can bias the piston 66 to return to an original position after the toggle 46 has been disengaged. In certain embodiments, after the actuation source 70 is de-energized, the plunger 42 can be returned to an original position to allow for the deployment actuator 24 to be reset.

In certain embodiments, a hydraulic reservoir 64 can provide fluid into the first chamber 62 to replenish fluid lost during operation. The check valve 65 can prevent fluid from flowing back into the hydraulic reservoir 64. In certain embodiments, the stroke amplifier 60 is in fluid communication with other hydraulic components within the RAT system 10 and the aircraft generally.

The terminology used herein is for the purpose of describing particular embodiments only and is not intended to be limiting of the embodiments. While the description of the present embodiments has been presented for purposes of illustration and description, it is not intended to be exhaustive or limited to the embodiments in the form disclosed. Many modifications, variations, alterations, substitutions or equivalent arrangement not hereto described will be apparent to those of ordinary skill in the art without departing from the scope and spirit of the embodiments. Additionally, while various embodiments have been described, it is to be understood that aspects may include only some of the described embodiments. Accordingly, the embodiments are not to be seen as limited by the foregoing description, but are only limited by the scope of the appended claims.

What is claimed is:

1. A ram air turbine actuator release device to release a ram air turbine actuator, the ram air turbine actuator release device comprising:
   a lock bolt releasably engaged to the ram air turbine actuator;
   a toggle comprising a toggle roller to engage the lock bolt, and a toggle pivot to couple the toggle to the ram air turbine actuator;
   a toggle actuator, comprising:
      an actuation source; and
      a stroke amplifier, comprising:
         a piston coupled to the actuation source;
         a first hydraulic chamber having a first diameter in fluid communication with the piston;
         a second hydraulic chamber having a second diameter in fluid communication with the first hydraulic chamber; and
         a plunger in fluid communication with the second chamber, wherein a diameter ratio between the first hydraulic chamber and the second hydraulic chamber amplifies a displacement of the actuation source to displace the plunger to rotate the toggle to disengage the toggle roller from the lock bolt.

2. The ram air turbine actuator release device of claim 1, wherein the plunger is displaced a desired distance that is greater than the displacement of the actuation source.

3. The ram air turbine actuator release device of claim 1, further comprising a reset plunger to bias the toggle to an engaged position.

4. The ram air turbine actuator release device of claim 1, wherein the actuation source is a high force low displacement actuator.

5. The ram air turbine actuator release device of claim 1, wherein the actuation source is a piezoelectric actuator.

6. The ram air turbine actuator release device of claim 1, further comprising a return spring disposed within the first chamber and coupled to the piston.

7. The ram air turbine actuator release device of claim 1, further comprising a reservoir in fluid communication with the first chamber.

8. A ram air turbine system, comprising:
   a ram air turbine;
   a deployment actuator to deploy the ram air turbine; and
   a ram air turbine actuator release device to release the actuator, the ram air turbine actuator release device comprising:
      a lock bolt releasably engaged to the deployment actuator;
      a toggle comprising a toggle roller to engage the lock bolt, and a toggle pivot to couple the toggle to the deployment actuator;
      a toggle actuator, comprising:
         an actuation source; and
         a stroke amplifier, comprising:
            a piston coupled to the actuation source;
            a first hydraulic chamber having a first diameter in fluid communication with the piston;
            a second hydraulic chamber having a second diameter in fluid communication with the first hydraulic chamber; and
            a plunger in fluid communication with the second chamber, wherein a diameter ratio between the first hydraulic chamber and the second hydraulic chamber amplifies a displacement of the actuation source to displace the plunger to rotate the toggle to disengage the toggle roller from the lock bolt.

9. The ram air turbine system of claim 8, wherein the plunger is displaced a desired distance that is greater than the displacement of the actuation source.

10. The ram air turbine system of claim 8, further comprising a reset plunger to bias the toggle to an engaged position.

11. The ram air turbine system of claim 8, wherein the actuation source is a high force low displacement actuator.

12. The ram air turbine system of claim 8, wherein the actuation source is a piezoelectric actuator.

13. The ram air turbine system of claim 8, further comprising a return spring disposed within the first chamber and coupled to the piston.

14. The ram air turbine system of claim 8, further comprising a reservoir in fluid communication with the first chamber.

* * * * *